(No Model.)
A. D. LANGILL.
SHOVEL.
No. 368,597.   Patented Aug. 23, 1887.
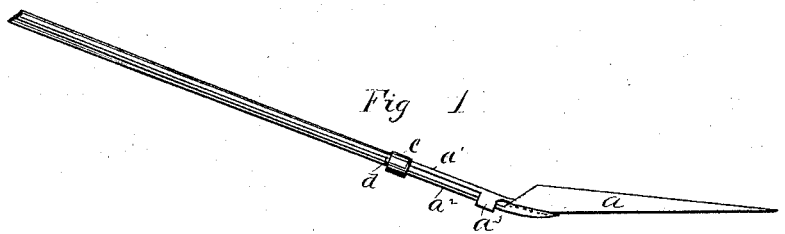
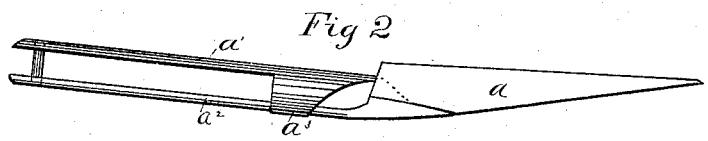
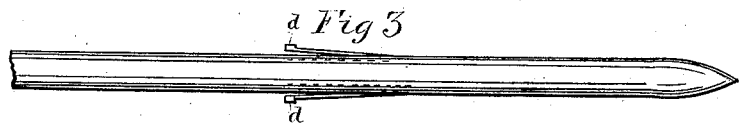
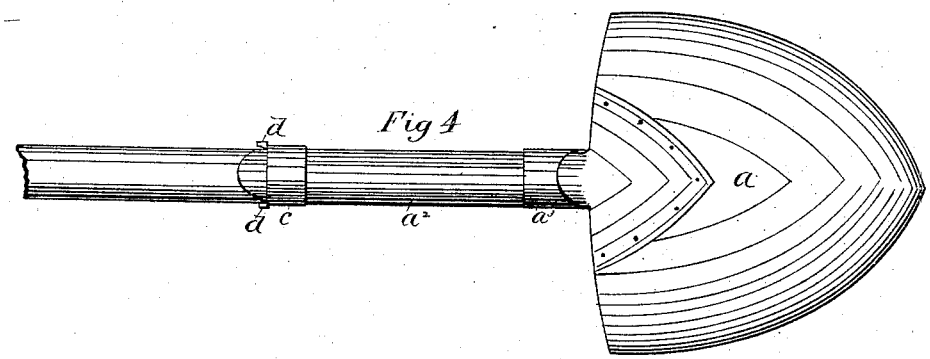
WITNESSES:
INVENTOR
BY
ATTORNEY

UNITED STATES PATENT OFFICE.

ALEXANDER D. LANGILL, OF DENVER, COLORADO, ASSIGNOR OF TWO-THIRDS TO MYRON VAN BUREN, OF SAME PLACE.

SHOVEL.

SPECIFICATION forming part of Letters Patent No. 368,597, dated August 23, 1887.

Application filed December 3, 1886. Serial No. 220,617. (No model.)

*To all whom it may concern:*

Be it known that I, ALEXANDER D. LANGILL, a citizen of the United States, residing at Denver, in the county of Arapahoe and State of Colorado, have invented certain new and useful Improvements in Shovels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to shovels.

The objects of my invention are, first, to provide a shovel from which the handle at any time may be removed and another inserted in the socket for the handle without the aid of tools and labor required by the ordinary arrangement of shovels now in use; second, to produce a shovel having extra strength, and thus rendering it more durable. I attain these objects by the mechanism illustrated in the accompanying drawings, in which—

Figure 1 is a side view of the shovel with a handle inserted. Fig. 2 is a side view of the shovel with the handle removed. Fig. 3 is a top view of the handle. Fig. 4 is a back view of the shovel complete.

$a$ is a shovel-blade. The socket for the reception of the handle is composed of two pieces, $a'$ and $a^2$, which are riveted to the blade in the ordinary manner. The piece $a'$ is formed with an annular projection, $a^3$. The piece $a^2$ is passed through the projection $a^3$ before the two pieces of the socket are riveted to the blade. The projection $a^3$ is for the purpose of strengthening the whole and bracing the piece $a^2$. It may, however, be omitted for ordinary use, and the shovel may be constructed in the ordinary manner, with the exception of the pieces $a'$ and $a^2$, having only one hole, in which a pin, $b$, is placed, which passes through the handle and holds it into the socket.

To prevent the pin $b$ from falling out, a ferrule, $c$, is passed over it and held in position by the spring-catches $d\ d$, which are securely fastened to the handle in such manner that they will hold the ferrule over the pin $b$, which at the same time holds the pieces $a'$ and $a^2$ firmly against the handle. There should be a recess in the handle, into which the catches $d\ d$ may be forced while the ferrule $c$ is passing over them. In replacing a handle the catches $d\ d$ are pressed toward each other, the ferrule slipped off, the pin $b$ removed, the old handle taken out, and a new one substituted, after which the pin and ferrule are replaced.

Having now fully described my invention, what I claim as new, and desire to secure by Letters Patent, is—

The combination of a shovel-blade having a socket for a handle, composed of pieces $a'$ and $a^2$, with a handle having catches $d\ d$ attached to it with a movable pin, $b$, and ferrule $c$, substantially as described, and for the purpose set forth In testimony whereof I affix my signature in presence of two witnesses.

ALEXANDER D. LANGILL.

Witnesses:
 MYRON HORN,
 W. H. DIXON.